Patented Apr. 12, 1938

2,113,842

UNITED STATES PATENT OFFICE 2,113,842

ADJUSTING THE SURFACE TENSION OF EMBALMING FLUIDS

Hilton Ira Jones, Wilmette, Ill., assignor to The Naselmo Corporation, Chicago, Ill., a corporation of Illinois No Drawing. Application October 2, 1935,
Serial No. 43,196

4 Claims. (Cl. 27—21)

In the use of embalming fluids I have found it highly desirable that in certain cases the surface tension thereof be either raised or lowered beyond the normal value of the embalming material. Thus, in general, it is a great advantage if the surface tension of the embalming fluid is lowered for the reason that such lowering of surface tension facilitates the passage of the embalming material through the tissues and capillaries of the body. This is highly desirable where a body has emaciated and shrunken areas wherein the capillaries are of small diameter and also in cases which have been affected by arteriosclerosis and where there has been thrombosis or other obstructions tending to cut down the size of capillaries or arteries through which the fluid must pass.

Such lowering of surface tension to facilitate passage of fluids through the body may be utilized in several ways in the embalming art. Thus, for example, the embalmer may utilize my invention in order to convey coloring matter through the body in order to impart a natural color thereto, and it may also be employed to facilitate the passage of bactericidal agents as well as hardening or tanning fluids such as are generally used in embalming.

Various other applications of my invention will no doubt suggest themselves to those skilled in the art.

As examples of substances which I have found highly efficacious for lowering the surface tension of embalming fluids, I might mention bile salts. These substances comprise essentially the sodium salts of taurocholic and glycocholic acids. I may utilize these salts, individually or together, in relatively pure condition, but find that satisfactory results may be obtained by taking commercial "inspissated ox-gall" having about 70 per cent dry content, dissolving said material in water to a concentration of about 15 per cent solids, heating the same to boiling with a small quantity, say, of about 5 per cent of activated carbon, and then filtering. This treatment removes most of the odor and color and provides a solution which may be used satisfactorily in connection with my invention and at a very low cost. This is diluted to a strength of about 0.1 to 0.2 per cent solids for convenient storage or shipment, but is used in much lower concentrations.

I have found that the effect of such salts on the surface tension of water varies considerably with the concentration, reaching a maximum of efficiency with this dilution of 0.1 to 0.2 per cent solids. This may be further diluted for use by combining one part of said solution with about 64 parts of water.

In general, a highly effective working solution may be of any concentration of solids of about 0.2 per cent or below, although I do not consider my invention as limited to such a figure.

I have also found that for embalming purposes other substances are capable of reducing the surface tension of aqueous solutions to a marked degree and among such materials are sulphonates or other esters of higher alcohols such as lauryl alcohol, their alkali salts and other derivatives. Other alcohols of this class are caproic, caprylic, capric, myristic, palmitic, stearic, arachidic, etc., the preferred ones being normal or straight chain alcohols having 9 or more carbon atoms. Besides sulphonates and their salts, I find that esters produced by introducing into a sulphonate or alkali salt thereof an acid or negative group are suitable and, in fact, preferable because of greater solubility, e. g., nitrates, chlorides, etc. As examples of this class of materials I may use sodium lauryl sulphonate or nitrated sodium lauryl sulphonate.

While I am aware that soaps in general are known to reduce surface tension, such materials as a class are unsuitable for embalming purposes, inasmuch as they form precipitates with hard water and especially in the presence of calcareous matter in the circulatory system of a body. However, soaps of the higher fatty alcohols such as I have mentioned do not have this property of forming insoluble alkaline earth compounds, and hence, function in an eminently satisfactory manner for my purposes. In addition to reducing surface tension of the fluid, such soaps also tend to lubricate the arteries and other passages through which it is desired that the embalming fluid should flow.

I have found that the substances mentioned above, i. e., the bile salts and the soaps of higher alcohols, maintain their function of reducing surface tension even when used in extremely low concentration. Thus, I have found that these materials maintain their capacity to reduce surface tension at dilutions well below one per cent.

While I am aware that certain alcoholic embalming fluids show a relatively low surface tension, this value is considerably raised after such fluids enter the body and are diluted with the aqueous body fluids, and becomes practically equal to that of water.

The following formulae represent examples of embalming fluids embodying my invention:

*Example I*

| | Parts by weight |
|---|---|
| Water | 48 |
| Glycerine | 8 |
| Methanol | 16 |
| Borax | 5 |
| Sodium nitrate | 7 |
| Phenol | 3 |
| Clarified solution (0.2 per cent solids) of inspissated ox-gall | 2 |
| Formaldehyde (40 per cent) | 210 |

*Example II*

| | Parts by weight |
|---|---|
| Water | 38 |
| Glycerine | 38 |
| Methanol | 38 |
| Phenol | 5 |
| Borax | 8 |
| Nitrated sodium lauryl sulphonate | 3 |
| Formaldehyde (40 per cent) | 200 |

There are certain other situations encountered in the embalming art where it is desirable that the surface tension of the fluid be raised rather than lowered. This is the case when a body has certain emaciated areas which it is desirable to fill out in order that it may assume a normal appearance. In such case it is desired that substances which are referred to as "tissue builders", and which usually consist of aqueous emulsions of vegetable gums or other materials in colloidal suspension, remain in the areas where they are introduced and will not gradually seep away. In such case a high surface tension is of value, for two reasons, first, that it will tend to stabilize the emulsion which it is desired to use in such cases and, second, because a high surface tension greatly tends to prevent seepage of the tissue builder through the capillaries and holds it in the restricted areas where it is introduced.

This effect of raising the surface tension so as to stabilize the emulsion and prevent its seepage can be obtained by certain derivatives of the rare earths. I have found it satisfactory and economical to take the rare earth compounds which are residues from the gas mantle industry, consisting usually of a mixture of different rare earth chlorides, and forming fluorates thereof by reaction with lead fluorate, lead chloride being separated as a precipitate. Also, I can use for the same purpose a rare earth salt of a sulphonate of a higher alcohol, or of a nitrated sulphonate of a higher alcohol, such as lauryl, etc.

A typical formula is as follows:

| | Parts by weight |
|---|---|
| Tragacanth | 2 |
| Bentonite | 10 |
| Rare earth fluorate (or rare earth lauryl sulphonate) | 1–2 |
| Add water to make | 100 |

I claim as my invention:

1. An embalming fluid containing an agent for lowering the surface tension of said fluid comprising a soluble salt of an acidic ester of a higher aliphatic alcohol, said agent facilitating the passage of said fluid through the capillaries whereby coloring matter may be conveyed through the body imparting a color thereto.

2. An embalming fluid containing a soluble alkali salt of an acid derivative of a higher aliphatic alcohol which is stable in the presence of hard water and calcareous material and which lowers the surface tension of said fluid so as to facilitate the passage of said fluid through the capillaries and tissues of the body.

3. An embalming fluid containing a soluble salt of an acid derivative of lauryl alcohol which is stable in the presence of hard water and calcareous material and which lowers the surface tension of said fluid so as to facilitate the passage of said fluid through the capillaries and tissues of the body.

4. An embalming fluid containing sodium lauryl sulphonate which is stable in the presence of hard water and calcareous material and which lowers the surface tension of said fluid so as to facilitate the passage of said fluid through the capillaries and tissues of the body.

HILTON IRA JONES.